(12) United States Patent
Douglas et al.

(10) Patent No.: US 9,061,274 B2
(45) Date of Patent: Jun. 23, 2015

(54) METHOD AND APPARATUS FOR TESTING A CATALYST MATERIAL

(71) Applicant: The Queen's University of Belfast, Belfast, County Antrim (GB)

(72) Inventors: Roy Douglas, Belfast (GB); Andrew Woods, Derrynoose (GB)

(73) Assignee: Catagen Limited, Belfast (GB)

( * ) Notice: Subject to any disclaimer, the term of this patent is extended or adjusted under 35 U.S.C. 154(b) by 0 days.

(21) Appl. No.: 14/265,445

(22) Filed: Apr. 30, 2014

(65) Prior Publication Data

US 2014/0235430 A1    Aug. 21, 2014

Related U.S. Application Data

(63) Continuation of application No. 13/133,985, filed as application No. PCT/GB2009/051698 on Dec. 11, 2009, now Pat. No. 8,753,996.

(30) Foreign Application Priority Data

Dec. 12, 2008  (GB) .................................. 0822626.8

(51) Int. Cl.
*B01J 37/08* (2006.01)
*F01M 13/04* (2006.01)
*F01N 11/00* (2006.01)
*B01D 53/86* (2006.01)

(52) U.S. Cl.
CPC ............... *B01J 37/08* (2013.01); *F01M 13/04* (2013.01); *F01N 11/00* (2013.01); *F01N 2550/20* (2013.01); *Y02T 10/47* (2013.01); *B01D 53/8696* (2013.01)

(58) Field of Classification Search
None
See application file for complete search history.

(56) References Cited

U.S. PATENT DOCUMENTS 7,131,320 B2 * 11/2006 Weinowski et al. ........ 73/114.75
(Continued)

FOREIGN PATENT DOCUMENTS

| WO | 2004007922 A1 | 1/2004 |
| WO | 2006066836 A1 | 6/2006 |
| WO | 2010022747 A1 | 3/2010 |

OTHER PUBLICATIONS

International Search Report and Written Opinion of the International Searching Authority from corresponding Patent Cooperation Treaty (PCT) Application No. PCT/GB2009/051698, mailed Mar. 17, 2010.
(Continued)

*Primary Examiner* — Melvin C Mayes
*Assistant Examiner* — Stefanie Cohen
(74) *Attorney, Agent, or Firm* — Gardner, Linn, Burkhart & Flory, LLP (57) ABSTRACT

A method of ageing a catalyst material includes at least the steps of: (a) heating a gaseous stream; (b) adding a least one pure hydrocarbon gas and an oxygen-containing gas to the heated gaseous stream to provide a combined stream; and (c) passing the combined stream through the catalyst material. The use of at least one pure hydrocarbon gas and an oxygen-containing gas allows maximum re-circulation of the exit stream from the catalyst material for reuse, while maintaining the correct C, H and O proportions being provided in the combined stream to replicate realistic use of the catalyst material.

16 Claims, 5 Drawing Sheets

(56) References Cited

U.S. PATENT DOCUMENTS

| | | |
|---|---|---|
| 7,610,752 B2 | 11/2009 | Dalla Betta et al. |
| 2005/0204804 A1 | 9/2005 | Weinowski et al. |
| 2009/0126354 A1 | 5/2009 | Gieshoff et al. |

OTHER PUBLICATIONS

Odaka, M. et al., "Deterioration Effect of Three-Way Catalyst on Nitrous Oxide Emission," SAE Conference International Congress and Exposition, XX, XX, Feb. 23, 1998, pp. 1-08, XP001172605.

* cited by examiner

METHOD AND APPARATUS FOR TESTING A CATALYST MATERIAL

CROSS REFERENCE TO RELATED APPLICATION

The present invention is a continuation of U.S. patent application Ser. No. 13/133,985, filed on Jun. 10, 2011, now U.S. Pat. No. 8,753,996, which claims the priority benefits of International Patent Application No. PCT/GB2009/051698, filed on Dec. 11, 2009, which is hereby incorporated herein by reference in its entirety.

BACKGROUND OF THE INVENTION

The present invention relates to a method and apparatus for testing a catalyst material. While the invention may be used for the ageing of a catalyst converter, it may have other applications as well.

Catalyst material is used in many locations and processes. One common example is catalyst material used in a catalytic converter for the exhaust stream of an internal combustion engine in vehicles, such as cars, motorcycles, trucks, etc. Other catalyst material processes and applications include those in the chemical and petrochemical industries, electricity generators, utility engines, marine applications, aerospace applications, etc.

Catalytic converters are most commonly known for use in automobile exhausts to reduce the toxicity of emissions from an internal combustion engine. Its purpose is to reduce levels of harmful gases, such as carbon monoxide (CO), hydrocarbons (HC) and various oxides of nitrogen ($NO_x$), by converting them into carbon dioxide ($CO_2$), water, nitrogen and oxygen.

A common catalyst material used in a catalytic converter consists of a fine layer of precious metal(s) dispersed on a carrier layer of highly porous alumina, ($Ah_2O_3$), washcoat, which in turn is bonded to a ceramic substrate. Other carriers that are commonly used as an alternative to alumina are silicon dioxide, ($SiO_2$), Titanium Dioxide, ($TiO_2$) and Zeolites (aluminum, silicon and oxygen compounds); however alumina remains the most popular choice. The substrate can come in a pellet or monolithic form: however the honeycomb monolithic structure is the most widely used. The material used in this type of structure can also vary. Some catalyst manufacturers opt for metallic monoliths which are composed of temperature-resistant aluminum coated steels, while most choose the ceramic structure. The most common precious metals for such catalyst material in this application are Platinum, Pt, Palladium, Pd, Rhodium, Rh and Vanadium Oxide, $V_2O_5$.

Due to increased public awareness in the environmental issues, governments are constantly updating emissions legislation by introducing more stringent emissions regulations for automobiles. Thus, there is increasing attention to and testing of catalytic converter performance, such as their ageing and lifetime.

One method of testing a catalytic converter is to continuously run an internal combustion engine in a test facility and to locate the catalyst in its exhaust. Public examples include the ZDAKW Ageing Cycle (European Commission Joint Research Centre), the LNT Ageing Cycle (Oak Ridge National Laboratory), and the STRAW-MAN Ageing Cycle, although manufacturers also develop their own cycles and normally these are not in the public domain and are considered 'trade secrets'.

However, the operating costs of fuel to fully age a catalytic converter to the point of deactivation can be $50,000 or more.

US2005/0204804 A1 discloses a method for artificially ageing a catalyst device for use on a catalyst test bench for converting exhaust gases. Hot ageing gas is provided by a burner, such as a gas turbine, and gas which emerges from the catalyst device is partially recirculated and admixed with the ageing gas to be fed to the catalyst device.

One problem with the invention shown in US2005/0204804 A1 is that the majority of the hot ageing gas is still based on combustion of a C-containing fuel, i.e. petrol, diesel or another gasoline material, which is then combusted in a burner. Significant costs are still required to provide such a fuel.

A second problem with the invention shown in US2005/0204804 A1 is that the combustion of a C-containing fuel requires a burner, which must be controlled within the test bench environment. Combustion of a fuel on a test bench scale does not provide accurate control of the proportions of gas constituents going to the catalyst device.

SUMMARY OF THE INVENTION

The present invention provides a more efficient and accurate method of ageing a catalyst material.

According to one aspect of the present invention, a method of ageing a catalyst material includes: (a) heating a gaseous stream; (b) adding a least one pure hydrocarbon gas and an oxygen-containing gas to the heated gaseous stream to provide a combined stream; and (c) passing the combined stream through the catalyst material.

The use of at least one pure hydrocarbon gas and an oxygen-containing gas allows the present invention to maximize re-circulation of the exit stream from the catalyst material for reuse, whist maintaining the correct C, H and O proportions being provided in the combined stream to replicate realistic use of the catalyst material.

The present invention also reduces the heating of the gaseous stream required before its contact with the catalyst material, by exothermic reaction which occurs following the combustion of the at least one pure hydrocarbon gas and oxygen-containing gas as they come into contact with the catalyst material. This reduces the costs required to run the method of the present invention.

The catalyst material may be any suitable single material or combination of materials, intended to catalyze a chemical change in one or more of the gases comprising the gaseous stream and/or the combined stream. One common example is a catalyst material used in a catalytic converter for the exhaust stream of an internal combustion engine in vehicles, such as cars, motorcycles, trucks, etc. Other catalyst material processes and applications include those in the chemical and petrochemical industries, electricity generators, utility engines, marine applications, aerospace applications, etc., including laboratory chemical reactions.

The catalyst material is generally provided with a carrier, optionally dispersed on a carrier layer, and optionally supported by a substrate such as those described hereinbefore, but not limited thereto. The present invention is not limited by the shape, size, support, nature, form or provision of the catalyst material, as long as it is useable in an ageing cycle in a manner known to the skilled artisan. Examples of well-known catalyst materials include three-way catalyst for cars, etc., diesel oxidation catalysts, LNT (lean $NO_x$ trap) catalysts, SCR catalysts, etc.

The present invention is also useable to age engine after-treatment components, such as various sensors, and the like, and the present invention extends to a method and apparatus for testing such components using the same steps and embodiments as described herein.

The gaseous stream may be made up of a single gas or combination of gases. Generally, the gaseous stream includes one or more constituents known to be part of the stream which passes through or which will pass through the catalyst material in use. For example, in an automobile catalyst converter, the engine exhaust stream generally includes a combination of carbon-containing materials, such as carbon monoxide, hydrocarbons, and one or more oxides of nitrogen ($NO_x$), with a background of $N_2$, $H_2O$ and $CO_2$.

In one embodiment to the present invention, the gaseous stream includes one or more synthetic gases, such as carbon dioxide and nitrogen, provided from one or more sources of such gases. Synthetic or man-made gases are well known in the art, and are generally supplied in bottled form ready for use.

The term "pure hydrocarbon gas" as used herein relates to a hydrocarbon gas having no more than 3% or 2% or 1% of inert impurities, such as nitrogen or argon, and having no more than 0.5% or 0.4% or 0.3% or 0.2% or 0.1% of active impurities, i.e., components or agents such as oil, lead, sulphur or phosphorus, etc., that are known would harm a catalyst material.

The pure hydrocarbon gas(es) may be added to the heated gaseous stream in the amount of 0.1 vol % to 10 vol % of the heated gaseous stream, preferably in the range 0.1 vol % to 5 vol %, more preferably in the range 0.3 vol % to 1.5 vol %.

The oxygen-containing gas may be added to the heated gaseous stream in the amount correct for reaction with the hydrocarbon gas and to facilitate lean and rich cycling of RAT ageing protocols. The skilled artisan would be able to determine the amount of oxygen-containing gas required on the basis of the amount of hydrocarbon gas, etc.

In another embodiment to the present invention, the gaseous stream is heated in step (a) to 300-1000° C.; that is the gaseous stream is heated without combustion to a suitable temperature such as in the range 300-1000° C.

Also, step (a) of the present invention may include electrically heating a gaseous stream, and the gaseous stream may be heated by one or more electrical heaters and/or heat-exchangers known in the art, preferably using electrical furnace heating. In this way, this embodiment of the present invention avoids the direct use of burners or gas turbines, such as those used in US 2005/0204804 A1, as well as the need for other combustion units, devices and apparatus. This significantly simplifies the method of the present invention compared with catalyst-ageing apparatus involving the supply of gaseous streams from combustion.

According to a further embodiment of the present invention, step (a) includes electrically heating a gaseous stream partly, substantially or wholly made up of one or more synthetic gases, preferably the synthetic gases of carbon dioxide and nitrogen.

The use of one or more simplified forms of heating a gas other than combustion also allows the formation and constitution of the gaseous stream to be more accurately provided and determined. The gaseous stream can be constituted from one or more pre-determined sources of the or each constituent gas, using control mechanisms such as valves, regulators and flow controllers, to accurately determine the amount and proportion/ratio of each constituent gas to form the final gaseous stream. This is not possible using combustion of a fuel.

There is also greater control of the temperature of the gaseous stream by using electric heating, leading to greater balance and stability, and in particular less variation in temperature as the gaseous stream is fed towards the catalyst material. This is in comparison with achieving a high gaseous stream temperature purely or mainly through the combustion of a fuel, whose temperature variation cannot be finely controlled.

Because the temperature of the gaseous stream in this embodiment can be accurately provided and determined prior to step (b), there can also be close and/or fine control of the amount of the pure hydrocarbon stream to be added in step (b) to achieve the desired temperature of the combined gas as it passes through the catalyst material. Thus, this embodiment of the present invention can provide a very stable system having little additional hydrocarbon gas required, and so little additional combustion thereof, maintaining a higher degree of control and stability over the general process and the temperature at the catalyst material.

In another embodiment to the present invention, the passage of the combined stream through the catalyst material provides an exit stream, and the method of the present invention further includes the step of (d) recirculating at least 50% by volume of the exit stream as the gaseous stream.

At least 70%, 80%, 90%, 95%, 97%, 98%, or even 99% by volume, or optionally all, of the exit stream may be recirculated as the gaseous stream. In this way, this embodiment of the present invention can significantly reduce the amount of the gaseous stream required, and therefore significantly reduce the costs for running the method and apparatus of this embodiment as the $CO_2/N_2$ mix is not continuously produced and discarded.

The gaseous stream may be recirculated a number of times to minimize additional gas requirements, such as in the range 3-20 times or more.

In another embodiment to the present invention involving at least some re-circulation of the exit stream as described above, the method of the present invention further comprises the step of:

(e) selecting the at least one pure hydrocarbon gas and an oxygen-containing gas to obtain reaction product(s) after step (c) able to minimize variation in the constitution and/or temperature of the combined stream in step (b) after the re-circulating of step (d).

This embodiment of the method can minimize variation in both the constitution and the temperature of the combined stream. The combined stream mix may be chosen to minimize the constitution of the downstream mix that is used to recirculate to step (b), so as to give a stable mix. The recirculation and the furnace can then provide a stable temperature.

In particular, this embodiment of the present invention is able to maintain a stable environment for the catalyst material testing, reducing the cost required for fully age-testing the catalyst material. This embodiment of the invention provides a stable environment such that the concentration and/or temperature of the feed stream or combined stream provided to the catalyst material has less than 5% or 4% or 3% or 2% or 1% variation during a cycle, generally a constant temperature cycle.

Thus, an embodiment of the present invention further provides a method of ageing a catalyst material comprising controlling the addition of the pure hydrocarbon gas(es), an oxygen-containing gas, or both, to the heated gaseous stream to provide the combined stream (for passing through a catalyst material), including the steps of:

(i) monitoring the temperature of the heated gaseous stream, the catalyst and the catalyst exit-stream; and (ii) controlling the volume of pure hydrocarbon gas(es), oxygen-containing gas, or both, added to the heated gaseous stream to maintain the catalyst temperature within a pre-determined range.

Step (ii) may include controlling the volume of pure hydrocarbon gas(es), oxygen-containing gas, or both, added to the heated gaseous stream after re-circulating at least some of the exit stream from the catalyst material into the gaseous stream of step (a) to maintain the catalyst temperature within a pre-determined range.

The pre-determined temperature range of the catalyst material depends upon the nature of the catalyst material being aged and other desired process conditions, but is generally in the range 400-1100° C., perhaps in the range 500-1000° C., occasionally higher, or peaking higher.

The ability of the embodiments of the present invention to provide the gaseous stream from one or more known sources of the or each constituent gas, and to control its amount, proportion and/or ratio in the final gaseous stream, also allows the or each constituent gas of the gaseous stream to be provided from known and simple sources. Such sources can be conventional gas cylinders or other known supply units, which are easier to provide, maintain and keep secure than a supply of a fuel such as petrol. The avoidance of the supply and use of a fuel, and the avoidance of its combustion, reduces operating costs, and reduces known hazards.

The pure hydrocarbon gas(es) may comprise one or more of the group including: methane, ethane, propane, propylene, butane, butylene, pentane, etc., and carbon monoxide. The pure hydrocarbon gas may be propane.

The oxygen-containing gas may be any suitable gas comprising oxygen, including, but not limited to, pure oxygen or air.

The gaseous stream and the at least one pure hydrocarbon gas and oxygen-containing gas may be admixed using any suitable method and/or apparatus known in the art. This may include a dedicated mixer or mixing volume, as well as simple pipe work, such as one or more T-pieces.

The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

Thus, a particular embodiment of the present invention is a method of ageing a catalyst material including at least the steps of:
(a) electrically heating a gaseous stream partly, substantially or wholly comprising one or more synthetic gases;
(b) adding a least one pure hydrocarbon gas and an oxygen-containing gas to the heated gaseous stream to provide a combined stream;
(c) passing the combined stream through the catalyst material; and
(d) re-circulating at 50% by volume of the exit stream from the catalyst material into the gaseous stream of step (a).

Advantages of the present invention may include at least one or more of the following:
1. Recirculation of the flow: most of the combined stream, typically 98% to 99% by volume, can be recirculated, and only a little additional added hydrocarbon gas and, e.g., air, are required to achieve the correct catalyst material temperature profile. This means that the gas stream in the ageing method or process is being reused, usually several times, and not merely produced and then exhausted.
2. With a background gas mix of $CO_2$ and nitrogen, the ageing process can be charged at the start, and then fully recirculated as the system is brought up to temperature.
3. Once the ageing process has reached a background temperature, the hydrocarbon gas/oxygen (e.g., air) mix can be added to produce desired catalyst exotherms in the catalyst material or bed. Adding the hydrocarbon gas and e.g. air as a balanced mix can maintain the correct background concentrations without a sophisticated monitoring and control system. Only a small amount of mix may need to be bled off to exhaust to maintain running pressure. The balance equation for this situation is:

$$C_3H_8 + 5O_2 + 18.8N_2 => 3CO_2 + 4H_2O + 18.8N_2$$

4. Control of the ageing process can be designed to have no control valves or moving mechanisms in contact with the hot gas or gases. The process can be designed to be inherently stable, as the hydrocarbon/air can be added in balance and so does not alter the balance of the mixture.

The present invention provides a method of ageing a catalyst which can be adapted to any suitable ageing regime including known ageing cycles, such as the ZDAKW Ageing Cycle, the LNT Ageing Cycle, and the STRAWMAN Ageing Cycle described above.

According to a second aspect to the present invention, there is provided an apparatus for ageing a catalyst material including at least:
(a) one or more heaters for heating a gaseous stream;
(b) a combiner to combine a least one pure hydrocarbon gas and an oxygen-containing gas to the heated gaseous stream to provide a combined stream; and
(c) a pathway for passing the combined stream through the catalyst material.

The apparatus may include:
(a) one or more electric furnace heaters for heating a gaseous stream partly, substantially or wholly including one or more synthetic gases;
(b) a combiner to combine a least one pure hydrocarbon gas and an oxygen-containing gas to the heated gaseous stream to provide a combined stream;
(c) a pathway for passing the combined stream through the catalyst material; and
(d) a pathway for re-circulating at least 50% by volume of the exit stream from the catalyst material into the gaseous stream.

These and other objects, advantages and features of this invention will become apparent upon review of the following specification in conjunction with the drawings.

BRIEF DESCRIPTION OF THE DRAWINGS

An embodiment to the present invention will now be described by way example only and with reference to the accompanying drawings in which.

DESCRIPTION OF THE PREFERRED EMBODIMENT

For the purpose of this description, a single reference number will be assigned to a line as well as a stream carried in that line. Referring to the drawings, FIG. 1 shows a method of ageing a catalyst material according to one embodiment to the present invention.

Figure 1:
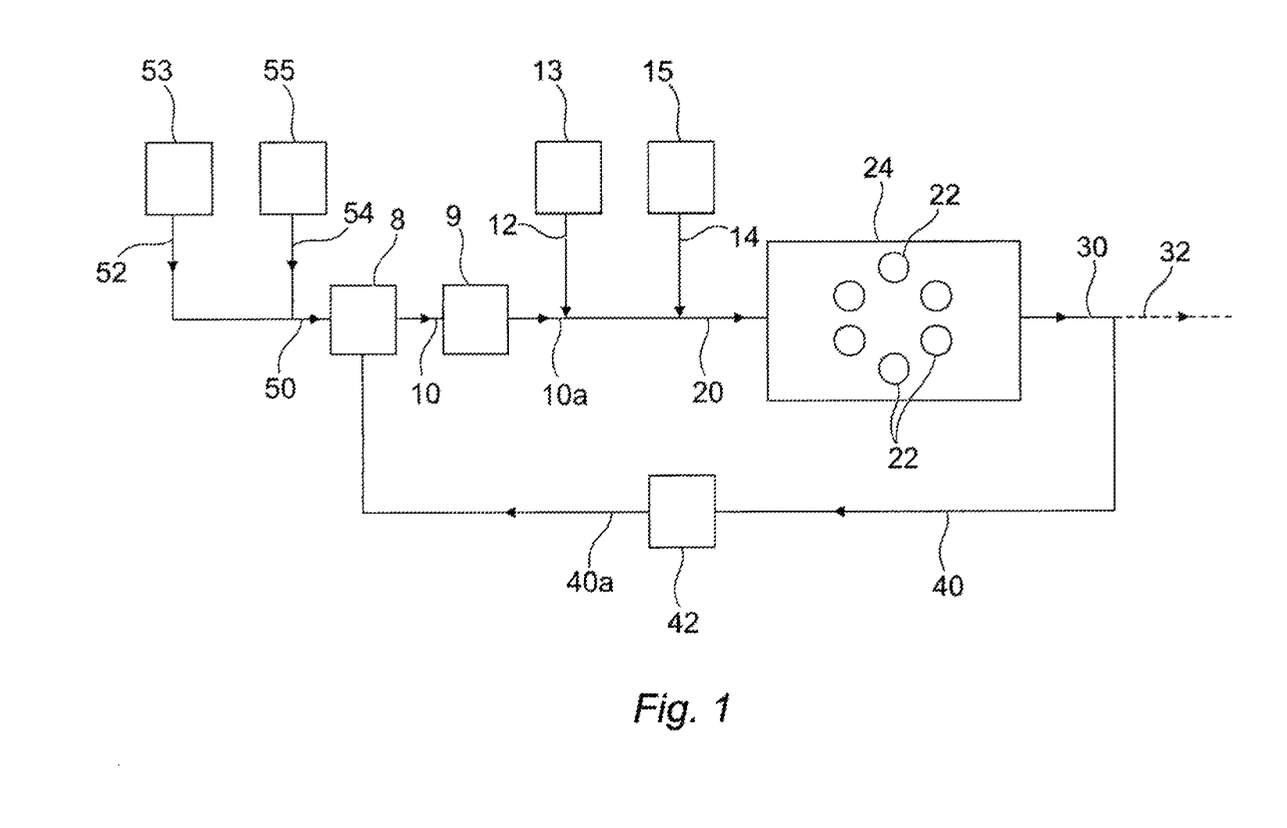
FIG. 1 is a schematic view of a method of ageing a catalyst material according to one embodiment of the present invention.

FIG. 1 shows the provision of a gaseous stream 10. In the illustrated embodiment, the gaseous stream 10 is at least 50% by volume formed from an exit stream 40 as discussed hereinafter. The gaseous stream 10 is heated in one or more heaters 9 to provide a heated gaseous stream 10a. One or more of the heaters 9 may be electrical, to provide safer and more controlled heating of the gaseous stream 10 than combustion of a fuel. One example of a suitable electrical heater is an infra-red tube furnace known in the art, and able to raise the temperature of the gaseous stream 10 to at least 450° C., such as in the range 500-800° C.

Added to the heated gaseous stream 10a is at least one pure hydrocarbon gas 12, such as propane, through a first supply line 12. The pure hydrocarbon gas can be provided from a source 13, such as one or more gas cylinders known in the art. Also added to the heated gaseous stream 10a is an oxygen-containing gas 14, such as air along a supply line 14. Air may be supplied from a second source 15 such as one or more air cylinders or air lines/air compressors known in the art.

Each line, stream, unit, etc., described herein may include one or more flow or volume control means, such as valves, able to control the amount and/or flow and/or volume of gas along that line, etc. The provision and control of control means such as valves are well known in the art, and so they are not specifically shown or further described herein. The admixture of the heated gaseous stream 10a, the pure hydrocarbon gas 12 and the oxygen-containing gas 14 provide a combined stream 20, which passes into a catalyst material manifold 24 holding the catalyst material 22. The catalyst material 22 may be any known or new catalyst material, whose dynamic ageing is desired to be tested to assist further knowledge or understanding of the performance of the catalyst material in use. Such ageing has also been termed "artificial ageing" and is intended to provide an intensive method to recreate the ageing of the catalyst material in use. One suitable catalyst material is a three-way catalyst used in cars.

The catalyst material manifold 24 may have any suitable shape, size or design, able to locate the catalyst material 22 in line with the combined stream 20. The catalyst material manifold 24 may include a plurality of catalyst material holders such that a plurality of catalyst samples can be simultaneously aged. This is further described herein below with reference to FIG. 3.

By passing the combined stream 20 through the catalyst material 22, there is provided an exit stream 30 from the catalyst material manifold 24. While a proportion of the exit stream 32 may be passed into the atmosphere, and the like, as a nonreturn stream 32, at least 50% by volume or greater, optionally all, of the exit stream 30 is re-circulated as a re-circulating stream 40 to provide at least the majority, optionally all, of the gaseous stream 10.

Optionally, the exit stream 40 passes through a pressure-changing valve, such as a venturi nozzle 42, or other appropriate flow measurement device, that facilitates calculation of the gas flow rate. The re-circulation stream 40a from the venturi nozzle 42 can be provided to a reservoir 8. The reservoir 8 provides a suitable location for the provision of the gaseous stream 10 with a known constitution of gas or gases, as well as providing a buffer to stabilize any flow changes.

Using the example of an internal combustion engine and a method of ageing an automobile catalyst converter, a suitable base gas mixture for the reservoir 8 may typically comprise about 80% by volume of nitrogen, about 10% by volume of carbon dioxide, and about 10% by volume of water vapour. These gases make up the majority gas composition from an internal combustion engine.

FIG. 1 shows the provision of two synthetic gases into the reservoir 8 to assist the provision of the gaseous stream 10. In the embodiment shown in FIG. 1, there may be a source of nitrogen 53 as a first synthetic gas to provide a nitrogen stream 52, and a source of carbon dioxide 55 as a second synthetic gas along a supply line 54, to provide a combined synthetic gas stream 50 into the reservoir 8. These gases can be supplied to the reservoir 8 via valves (not shown) including flow controllers and solenoid valves for control purposes. The or each synthetic gas source can supply gas required in the reservoir 8 as part of the setup of an ageing method, as well as being able to ensure a steady state or 'top up' supply of gas in the reservoir 8 during running of the ageing method due to any loss of gas that may occur during the process.

The scheme shown in FIG. 1 may also include one or more devices, units or apparatus able to provide movement of one or more of the gases, especially the gaseous stream towards the catalyst material, and the exit stream being re-circulated. Suitable units, etc., are known in the art for such movement, including pumps, turbochargers and fans, such as centrifugal fans.

As an internal combustion engine typically provides an exhaust stream having about 80% nitrogen, there can be such significant re-circulation of the exit stream 30 from the catalyst material 22 which can be reused to provide at least the majority, possibly all, of the gaseous stream 10. Thus, the critical balance of the other constituents of a typical exhaust stream, especially the amount of carbon dioxide, can be carefully maintained by the correct introduction of the at least one pure hydrocarbon gas 12 and the oxygen containing gas 14, as discussed further below.

As the combined stream 20 contacts the hot catalyst material 22, there is combustion of the at least one pure hydrocarbon gas 12 in combination with the oxygen-containing gas 14, such that the exothermic reaction increases the temperature of the catalyst material 22 so that it is higher in temperature than the temperature of the heated gaseous stream 10a. Although a catalytic converter under normal operation in a gasoline car would be in the range 500-600° C. for the majority of the time, testing a catalyst material at a higher temperature, such as 800° C.-1000° C., achieves faster results, again reducing the costs of operation.

Figure 5:
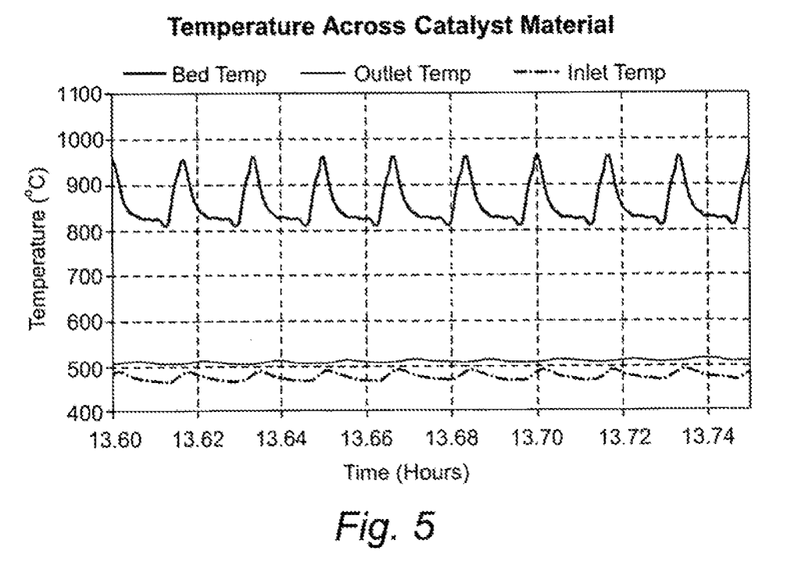
FIG. 5 is a graph of temperature against time across a catalyst material tested by the present invention.

FIG. 5 shows a graph of temperature of catalyst material 22 over time, which ranges between approximately 800° C. and 950° C., while the temperature of the combined stream 20 through the inlet of the catalyst material manifold 24 and the outlet temperature of the exit stream 30 are in the vicinity of 500° C.

The variation of the temperature across the catalyst material in FIG. 5 can be provided by pulsing the introduction of the at least one pure hydrocarbon gas 12 and the oxygen-containing gas 14, so as to create temperature 'spikes' above 900° C., and possibly up to 1000° C. The exothermic reaction on the catalyst surface between the hydrocarbon containing gas and the oxygen-containing gas causes an exotherm that elevates the temperature accordingly. The feed gases can be switched between stoichiometric, rich and lean cycling to age the catalyst in line with conventional or industry practices.

The pure hydrocarbon gas(es) and the oxygen-containing gas can be provided continuously, in one or more cycles or pulsing operations, or a combination of same. The supply of the at least one pure hydrocarbon gas 12 and the oxygen-containing gas 14 may be such as to provide at least carbon dioxide and nitrogen proportions of the gas around the catalyst material 22 in proportions that reflect the proportions of an exhaust gas from an internal combustion engine.

Figure 4:
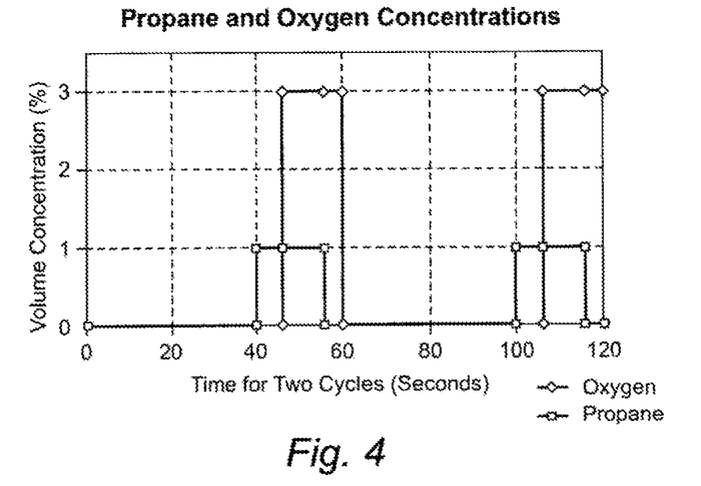
FIG. 4 is a graph of volume over time for the provision of propane and oxygen into an embodiment to the present invention.

FIG. 4 shows one example of the volume concentrations of propane as the pure hydrocarbon gas 12 and oxygen gas 14 as air as the oxygen-containing gas into the heated gaseous stream 10a over two cycles. The concentrations and timing of the cycle shown in FIG. 4 are intended to recreate Rapid Ageing Test (RAT) A ageing based on using one mole of propane in comparison to three moles of carbon monoxide to produce the known catalyst bed temperature profile. Certainly, it requires less propane than carbon monoxide to produce the same temperature excursions.

Figure 6A:
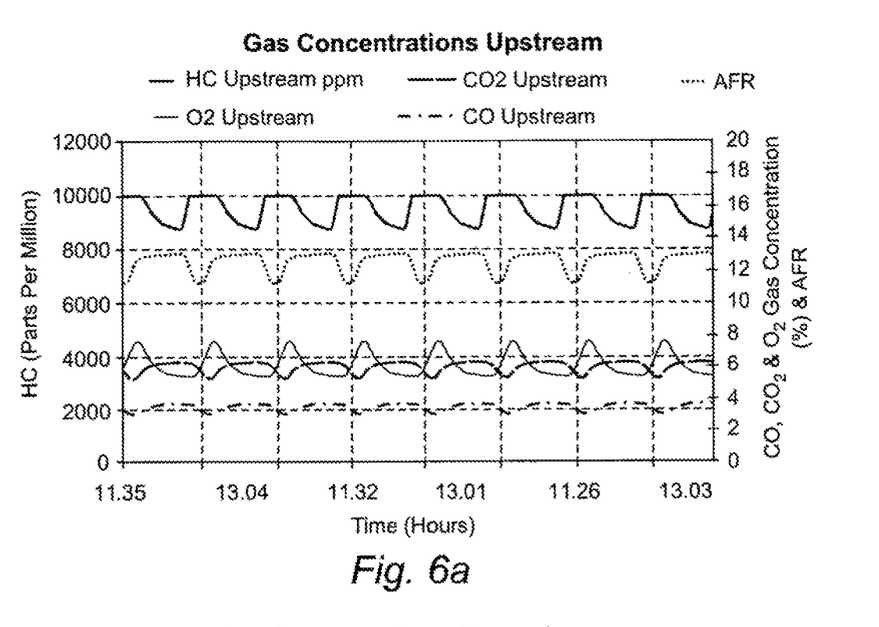
FIGS. 6a and 6b are gas concentrations upstream and downstream of the catalyst material of FIG. 5.
Figure 6B:
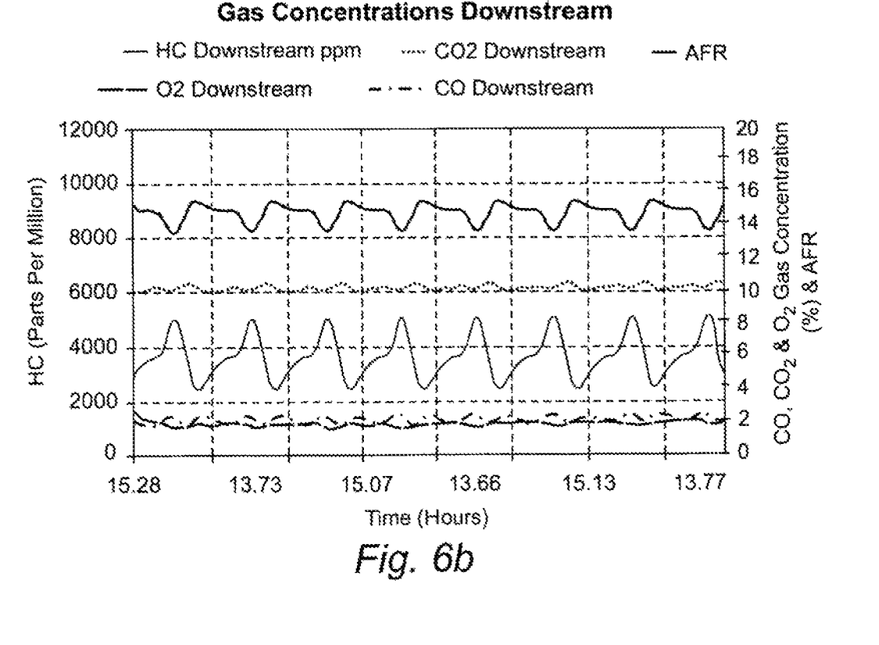

FIGS. 6a and 6b show gas concentrations of various gas constituents in the combined stream 20 and the exit stream 30 based on a method of RAT A ageing. These concentrations confirm that catalytic reactions are taking place within the catalyst material, and that the temperature of the catalyst material is at a desired level, such that the method is able to carry out accelerated heating operations and protocols.

Figure 7:
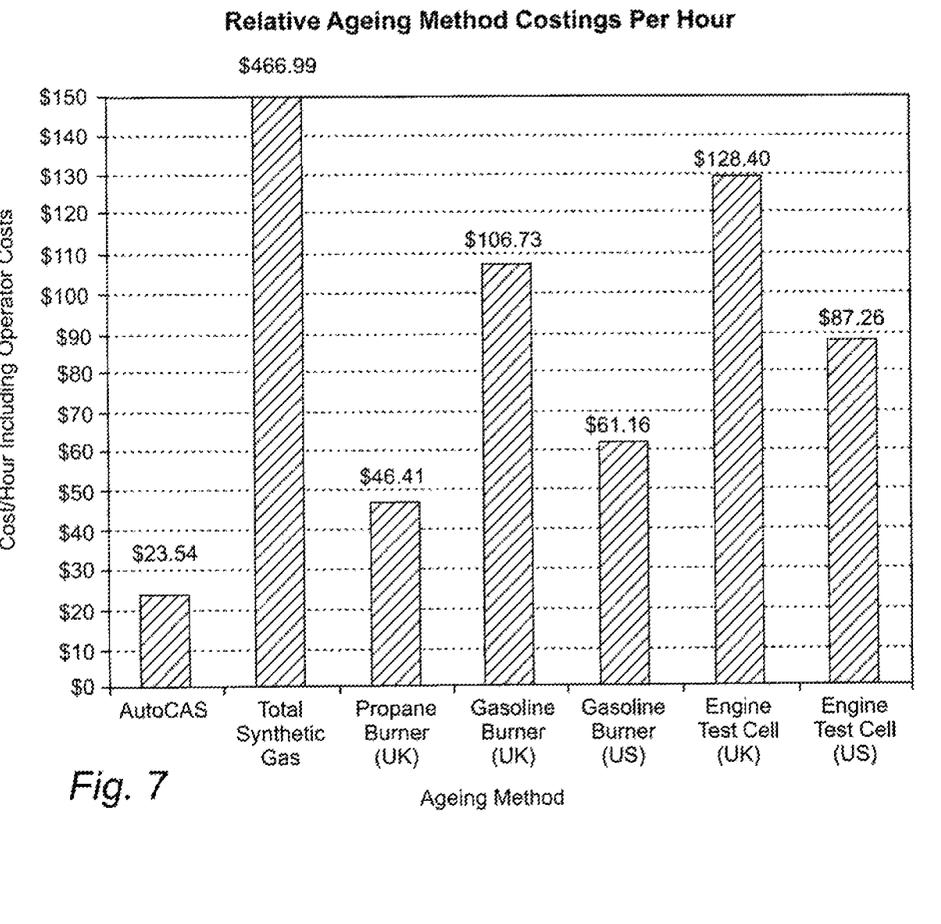
FIG. 7 is a graph of the analysis of cost/hour of various methods of ageing a catalyst material.

FIG. 7 indicates relative costs incurred in various methods of ageing a catalyst material such as an automobile catalyst converter, based on typical dollar figures at the time of testing. Using "total synthetic gas" with no re-circulation, suggests a relative cost of "$466.99" per hour to provide equivalent ageing to an embodiment to the present invention entitled "AutoCAS".

Figure 2:
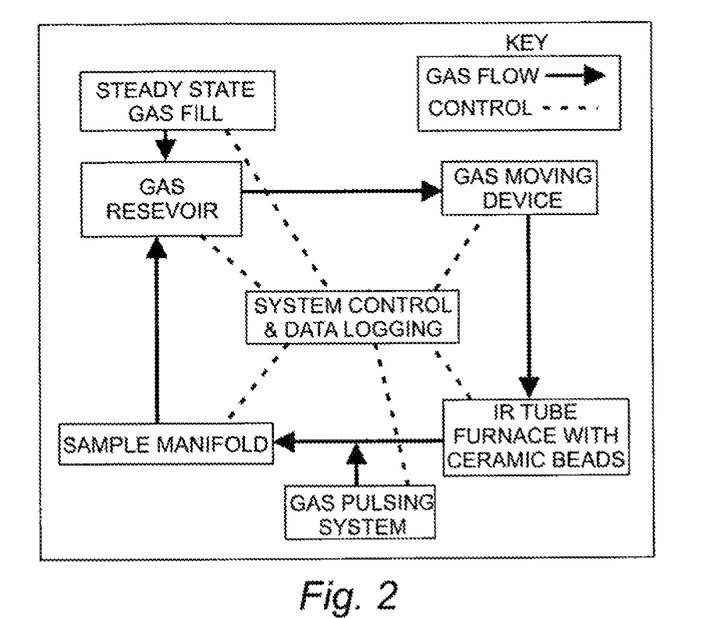
FIG. 2 is a second schematic view of the method of FIG. 1.

FIG. 2 shows an alternative scheme for operating an embodiment of the method of the present invention.

Figure 3:
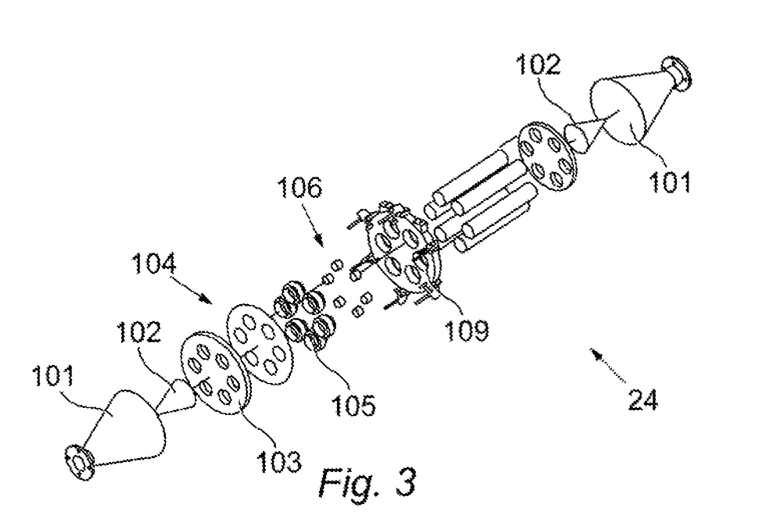
FIG. 3 is an exploded perspective view of a catalyst material manifold for use with an embodiment to the present invention.

FIG. 3 shows an exploded perspective view of a catalyst material manifold 24 useful in the method shown in FIG. 1. FIG. 3 shows two end cones 101, having inner cones 102, plates and gaskets 103, 104 and six catalyst material sample inserts 105 able to hold six catalyst material samples 106 on a housing plate 109. In this way, a plurality of catalyst material samples 106 could be simultaneously aged, being the same catalyst material or different.

Embodiments of the present invention are able to provide methods of ageing one or more samples of catalyst material using a highly repeatable and stable test able to create the same process conditions repeatedly. Multiple samples can be simultaneously tested. Further, the level of carbon dioxide emitted into the atmosphere compared with an internal combustion engine or the use of a burner is significantly reduced. In particular, the synthetic gas can be made up as a background gas mix, such as of $CO_2$ and nitrogen, and the system charged with this gas at the start. This gas can then be fully recirculated as the system is brought up to temperature. Once the system has reached ageing background temperature, the hydrocarbon/air mix can be added to produce the catalyst exotherms. This avoids the need to continually produce new combusted gas to produce the ageing gas mix, which requires temperature control and is also difficult to operate due to the temperatures involved.

Embodiments of the present invention also allow a hydrocarbon and air to be provided as a balanced mix; this maintains the correct background concentrations without a sophisticated monitoring system. Only a small amount of mix may need to be bled off to exhaust to maintain running pressure.

Embodiments of the present invention particularly provide a recirculated background gas, the exotherm produced in the catalyst bed with a small amount of "fuel", and the fuel added in an exact balance with air to keep the mix at the correct concentrations.

Thus, embodiments of the present invention are able to provide methods of ageing a catalyst material using minimal additional resources by recirculating a significant amount of its exit stream, providing heating of the gaseous stream to a relatively low temperature compared to the desired temperature of the catalyst material, and by then raising the gas temperature by the correct proportional introduction of a pure hydrocarbon gas(es) and an oxygen-containing gas, whose exothermic reaction on the surface of the catalyst results in an increase in the temperature of the catalyst bed. In particular, a stable environment can be maintained for the catalyst material testing, reducing the cost required for fully age-testing the catalyst material. This is in contrast to real engines and known ageing systems, which produce undesirable fluctuations in both concentration and temperature. A very stable background gas of $N_2$, $CO_2$ and water can be provided and heated to a very stable temperature in the furnace before entering the catalyst material. At entry, precise amounts of preferably air and hydrocarbon gas produce an exotherm in the catalyst material. So the air, hydrocarbon gas and temperature cycle vary with time, but in a controlled precise way, whereas an engine or known ageing system produce unwanted variation superimposed on the required cycling.

Various modifications and variations to the described embodiments of the present invention would be apparent to those skilled in the art without departing from the scope of the invention as defined herein. Although the invention has been described in connection with specific preferred embodiments, it should be understood that the invention as claimed should not be duly limited to such specific embodiments.

The invention claimed is:

1. A method of ageing a catalyst material comprising:
   (a) providing a gaseous stream comprising a background gas mix;
   (b) adding at least one pure hydrocarbon gas and an oxygen-containing gas to the gaseous stream to provide a combined stream;
   (c) passing the combined stream through the catalyst material; and
   (d) re-circulating greater than or equal to 50% by volume of an exit stream from the catalyst material into the gaseous stream:
   (e) providing in (b) a balanced mix of said at least one pure hydrocarbon gas and an oxygen-containing gas to maintain the concentrations of the gases of said background gas mix in the re-circulated exit stream; and
   (f) heating said gaseous stream without combustion.

2. A method as claimed in claim 1, wherein (f) is performed as part of (a).

3. A method as claimed in claim 1, wherein said background gas mix comprises a mix of carbon dioxide and nitrogen and wherein in (e) said balanced mix of said at least one pure hydrocarbon gas and an oxygen-containing gas is selected to maintain concentrations of carbon dioxide and nitrogen in the re-circulated exit stream that are typical of the exhaust stream of an internal combustion engine.

4. A method as claimed in claim 1 wherein (f) comprises electrically heating said gaseous stream.

5. A method as claimed in claim 1 wherein (f) comprises electrically heating said gaseous stream using electrical furnace heating.

6. A method as claimed in claim 1 wherein (f) comprises electrically heating a gaseous stream partly, substantially or wholly comprising one or more synthetic gases.

7. A method as claimed in claim 6 wherein the gaseous stream comprises the synthetic gases of carbon dioxide and nitrogen.

8. A method as claimed in claim 1 comprising re-circulating at least 70% by volume of the exit stream from the catalyst material into the gaseous stream.

9. A method as claimed in claim 1 further comprising selecting the at least one pure hydrocarbon gas and an oxygen-containing gas to obtain at least one reaction product after (c) able to minimize variation in the constitution and/or temperature of the combined stream in (b) after the re-circulating of (d).

10. A method as claimed in claim 1 wherein the gaseous stream is recirculated in the range of between 3 and 20 times.

11. A method as claimed in claim 1 wherein the pure hydrocarbon gas is propane.

12. A method as claimed in claim 1 wherein the gaseous stream is heated in (f) to 300-1000° C.

13. A method as claimed in claim 1 wherein the catalyst material comprises a plurality of catalyst samples being simultaneously aged.

14. A method as claimed in claim 1 wherein the temperature of the combined gas as it passes through the catalyst material is in the range 400-1100° C.

15. A method as claimed in claim 1, wherein the at least one pure hydrocarbon gas is added in the range 0.1%-5% by volume of the gaseous stream.

16. A method as claimed in claim 1 further comprising controlling at least one chosen from (b) the addition of the at least one pure hydrocarbon gas and the oxygen-containing gas including:
  (i) monitoring the temperature of the heated gaseous stream, the catalyst and the catalyst exit-stream; and
  (ii) controlling the at least one chosen from the volume of the at least one pure hydrocarbon gas and the oxygen-containing gas to maintain the catalyst temperature within a predetermined range.

* * * * *